United States Patent [19]

Christenson

[11] Patent Number: 4,832,322
[45] Date of Patent: May 23, 1989

[54] DRUM WELDING APPARATUS

[75] Inventor: Ronald E. Christenson, Mantorville, Minn.

[73] Assignee: McNeilus Truck and Manufacturing, Inc., Dodge Center, Minn.

[21] Appl. No.: 170,889

[22] Filed: Mar. 21, 1988

[51] Int. Cl.$^4$ ............................................. B25B 11/00
[52] U.S. Cl. ........................................ 269/21; 228/48
[58] Field of Search ................... 228/48, 49, 50, 47 A, 228/49.2; 269/21

[56] References Cited

U.S. PATENT DOCUMENTS

| | | | |
|---|---|---|---|
| 3,239,209 | 3/1966 | Kucka | 228/48 |
| 3,275,794 | 9/1966 | Dubusker et al. | 228/50 |
| 3,406,938 | 10/1968 | Muir | 269/21 |
| 3,538,594 | 11/1970 | Wilkes | 269/21 |
| 3,935,985 | 2/1976 | Prudhomme et al. | 269/21 |
| 4,066,249 | 1/1978 | Huber et al. | 269/21 |
| 4,527,783 | 7/1985 | Collora et al. | 269/21 |
| 4,637,540 | 1/1987 | Fujita et al. | 228/48 |

Primary Examiner—M. Jordan
Attorney, Agent, or Firm—Orrin M. Haugen; Thomas J. Nikolai; Frederick W. Niebuhr

[57] ABSTRACT

An apparatus is disclosed for automatically welding sheet metal panels to form part of a revolving drum for concrete transit mixers. The apparatus includes a fixture having an annular central core, linear and generally longitudinal ribs extended away from the core, and circumferential ribs extended radially outwardly of the core. The ribs intersect to define compartments in the fixture which are closed when the sheet metal panels are placed on the fixture. The compartments are then evacuated, creating a pressure differential to fix the panels on the fixture. A welding carriage is slidably supported on a rail above the fixture. The fixture can be tilted to selectively align panels along the rail for welding linear seams. Circumferential seams are welded by rotation of the fixture while the carriage is held stationary. To more positively maintain the panels in place during welding, compartments along the interfacing edges of adjacent panels are subjected to a higher vacuum.

10 Claims, 4 Drawing Sheets

DRUM WELDING APPARATUS

BACKGROUND OF THE INVENTION

This invention relates to fixtures utilized to support sheet members as they are fastened together, and more particularly to a fixture for positioning sheet metal panels welded together in forming the rotatable drum of a ready-mix concrete truck.

Transit concrete mixers include a cab for the operator and a rotatable drum behind the cab containing and mixing the concrete ingredients. The drum is formed of multiple sheet metal panels, welded to one another along their interfacing edges to form the unitary drum. Some of the panels, particularly the panels making up the rear cone portion of the drum, have a large surface area, and of course must be of sufficient thickness to withstand the weight and in-transit jostling of the concrete ingredients. Consequently, individual panels are heavy and difficult to handle, making the welding of these panels a cumbersome, time consuming process. Overhead cranes or the like are needed to handle subassemblies.

Therefore, it is an object of the present invention to provide an apparatus for supporting multiple sheet metal members for their joinder into a unitary weldment.

Another object of the invention is to provide a welding fixture for positively maintaining multiple sheet metal panels in a predetermined configuration, and maintaining this configuration during an automated welding process.

Yet another object is to provide a fixture that is movable for adjustably positioning the interfacing edges between adjacent multiple sheet metal panels, for aligning the edges to facilitate automatic welding therealong, and further to controllably move the edges with respect to welding equipment in the course of forming a weld.

SUMMARY OF THE INVENTION

To achieve these and other objects, there is provided a fixture for positioning a plurality of sheet members for joinder to one another in a predetermined configuration. The fixture includes a substantially rigid frame means, a plurality of longitudinal ribs mounted to the frame means and extended away from a frame surface of the frame means substantially normal to the frame surface, and a plurality of transverse ribs mounted to the frame means and extended away from and substantially normal to the frame surface. The longitudinal and transverse ribs intersect one another and have outer longitudinal and transverse outer rib surfaces, respectively, which together form a predetermined profile spaced apart from the frame surface. The longitudinal and transverse ribs are adapted for supporting a plurality of sheet members in spaced apart relation to the frame surface. At least selected ones of the longitudinal and transverse ribs support adjacent ones of the sheet members along their interfacing edges, to facilitate the fastening of the sheet members to one another along the interfacing edges. A forcing means continually urges the sheet members against the outer rib surfaces to cause the sheet members to conform to the predetermined profile, and maintains the sheet members against the outer rib surfaces during fastening.

Preferably, the forcing means is a suction means for drawing a vacuum in compartments formed by the frame means and ribs, which compartments are enclosed when the sheet members overlie them. The vacuum is advantageously applied selectively, with a greater vacuum being drawn in compartments adjacent the interfacing edges of the sheet members. In this manner, maximum vacuum force is applied where a positive hold is most vital along the sheet member edges.

In a fixture used for forming the rear cone of a concrete transit mixer drum, the outer rib surfaces define a generally cylindrical configuration, or more precisely two adjacent and coaxial truncated cones. Further, the fixture is movable, to controllably position sheet metal panels in relation to an automatic welding carriage. The weld carriage is moved linearly to weld longitudinal seams. Circumferential or girth seams are welded with the carriage held stationary, by rotation of the fixture at a controlled speed.

A plurality of stops mounted pivotally to the fixture can be employed to properly align the first panel placed upon the fixture. A vacuum is drawn to maintain the initial panel in place, so that it may be used to guide the positioning of subsequent panels. Much of the difficulty in manually aligning separate panels is avoided. As the vacuum is continually drawn and maintains the panels in place, no manual intervention is required once the panels are in place. Welding is accomplished automatically, either by movement of the welding carriage or by rotation of the fixture without direct operator handling of either the fixture or welding equipment.

Thus, in accordance with the present invention the weld fixture supports multiple sheet metal panels for automatic welding into a one piece drum section. The end result is the ability to form the desired weldment in substantially less time, and without handling separate subassemblies. Also, in enabling a simultaneous alignment of all sheet metal panels comprising the rear cone, the fixture permits a more precise alignment of all panels for more consistent welds between panels and for drum manufacture according to stricter tolerances, if desired.

IN THE DRAWINGS

For a better appreciation of the above and other features and advantages of the invention, reference is made to the following detailed description and the drawings, in which.

DETAILED DESCRIPTION OF THE PREFERRED EMBODIMENT

Figure 1:
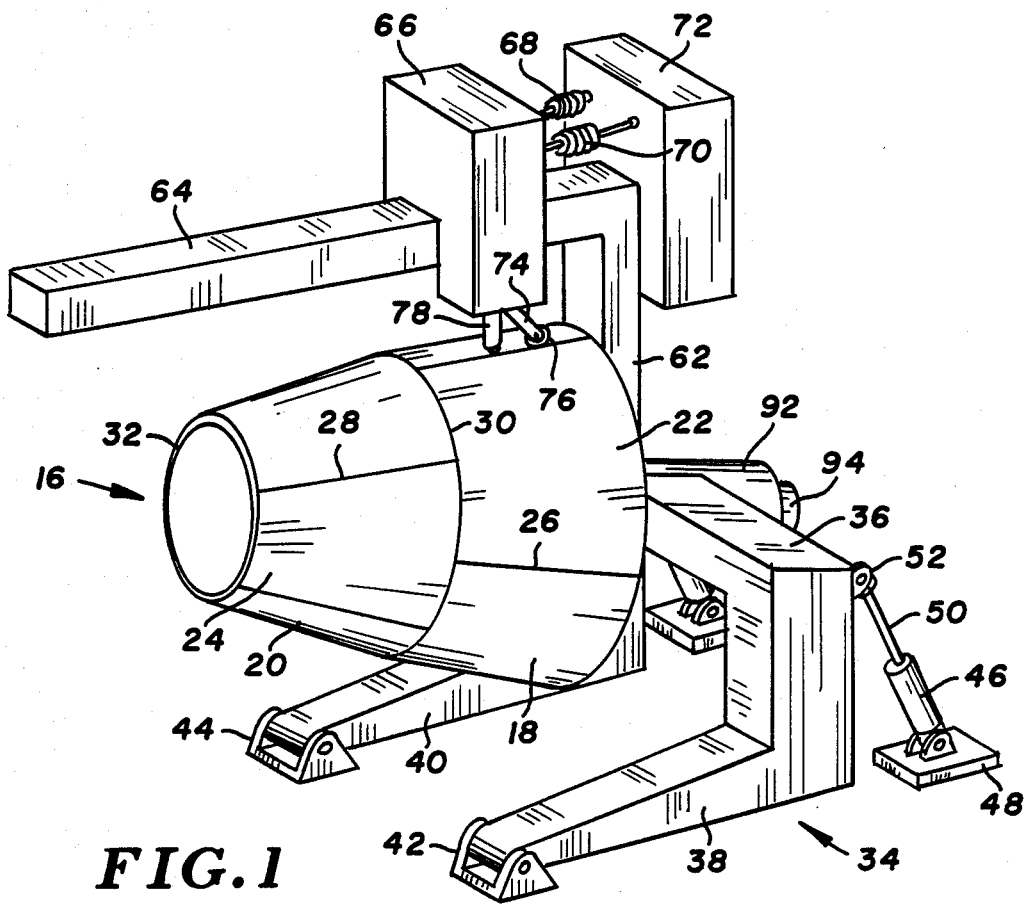
FIG. 1 is a perspective view showing a drum welding fixture and welding carriage arranged in accordance with the present invention.

Turning now to the drawings, there is shown in FIG. 1 an apparatus for forming a rear cone 16 of a concrete mixing drum. Rear cone 16 includes a forward section 18 and a comparatively more steeply tapered rearward section 20, each shaped as a truncated cone. The cone is formed of eight interconnected sheet metal panels: four front panels 22 forming the forward section, and four rear panels 24 comprising the rearward section. To form each section, the corresponding panels are welded together along their interfacing straight edges, forming linear seams at 90° intervals. Straight seams 26 between adjacent front panels 22 are offset 45° from seams 28 between the rear panels in order to reduce continuous seam length, resulting in a more durable cone. To complete the cone, a circumferential weld is made along the interfacing curved panel edges to form a girth seam 30.

During welding, panels 22 and 24 are supported on a weld fixture 32 which is shaped to support the panels in the predetermined cone configuration. Fixture 32 is mounted on a fixture support frame 34 including a horizontal member 36 and two opposed L-shaped legs 38 and 40. The L-shaped members are pivotally supported by a pair of floor-mounted stands 42 and 44, associated with legs 38 and 40, respectively. Fixture 32 thus can be pivoted or tilted about a horizontal axis running through stands 42 and 44.

For controlled tilting of fixture 32, a pair of hydraulic cylinders is mounted between the fixture support frame and the floor. More particularly, a first cylinder 46 is mounted pivotally to the floor through a support bracket 48, and includes an extensible rod 50 mounted to one end of horizontal member 36 through a clevis 52. A second cylinder 54 (FIG. 2) and rod 56 are similarly mounted by a bracket 58 and clevis 60. Cylinders 46 and 54 operate in concert to precisely control the tilt angle of fixture 32.

Mounted above fixture 32, on a vertical column 62, is a horizontal rail 64. A welding head or carriage 66 is supported by rail 64 for reciprocal sliding movement. Cables 68 and 70, connected between carriage 66 and a control panel 72 on the vertical column supply power to the welding carriage and expand in accordion-like fashion to permit carriage movement to the free end of rail 66.

Carriage 32 in FIG. 1 is positioned for a linear weld, particularly along one of seams 26 between a pair of the front panels. The fixture is tilted so that the top surface of forward cone section 18 is parallel to rail 64. To form the weld, carriage 32 moves from right to left as viewed in FIG. 1. A probe 74, inclined with respect to the carriage, has a guide wheel 76 at its free end, which traverses the space between the two interfacing panel edges, and thereby determines the vertical and lateral position of an arc welding tip 78 which follows the probe. Further details of the weld carriage are not discussed, as such carriages are known to those skilled in the art.

Figure 2:
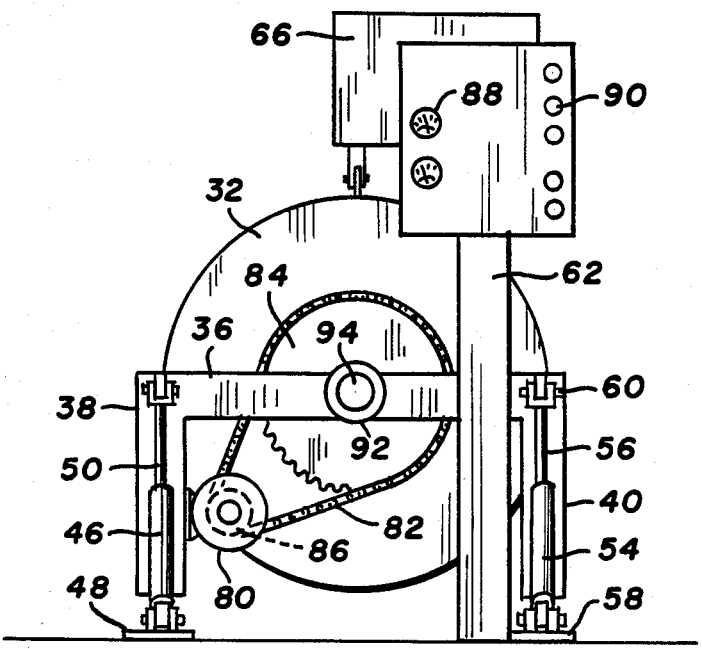
FIG. 2 is a front elevation of the fixture and carriage of FIG. 1.

Fixture 32 is rotatable in the clockwise direction as viewed in FIG. 2. To this end, there is provided a drive motor 80 mounted to leg 38. A chain 82 is mounted on a large driven sprocket 84 integral with fixture 32, and to a smaller drive sprocket behind the drive motor, as indicated by broken lines at 86. Also seen in the figure are gauges 88 and signal lights 90 on control panel 72, which aid the operator in monitoring the weld in progress.

Figure 3:
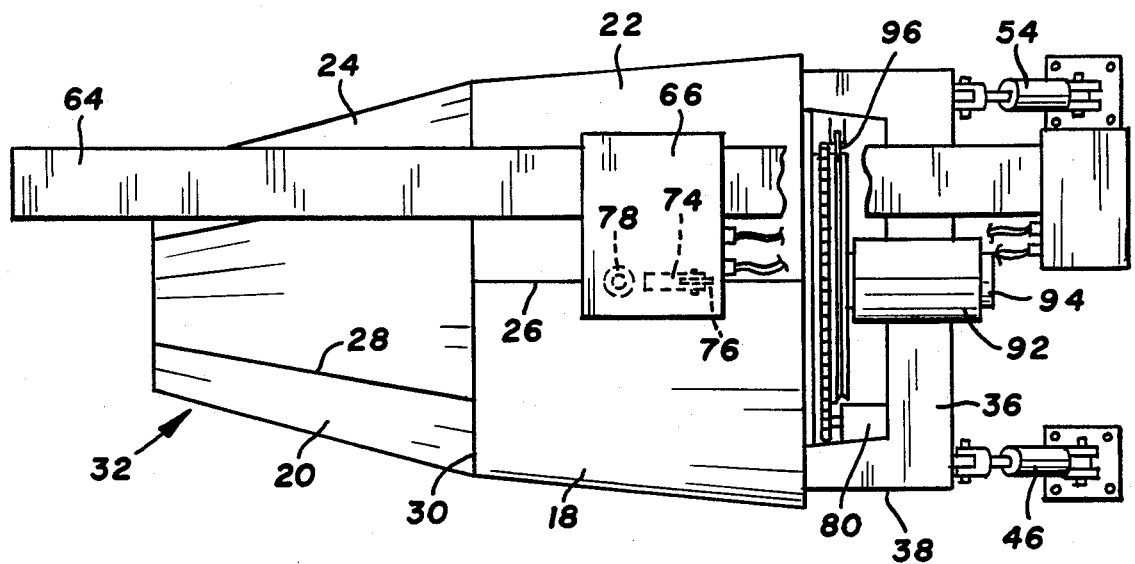
FIG. 3 is a top plan view of the fixture and welding carriage.

FIG. 3 further illustrates the parallel relation between rail 64 and the top seam of seams 26. Weld tip 78 and probe 74 are positioned directly above the seam. Thus, while hydraulic cylinders 46 and are utilized prior to the weld to position fixture 32 in the desired tilt, the actual welding of seam 26 is accomplished solely by a controlled sliding of carriage 66 along the rail. A cylindrical housing 92, integral with horizontal member 36, encloses a central longitudinal shaft 94 integral with fixture 32. Bearings (not shown) between the housing and shaft facilitate rotation of the fixture. Also illustrated is a copper wire 96 for grounding the fixture during welding.

Figure 4:
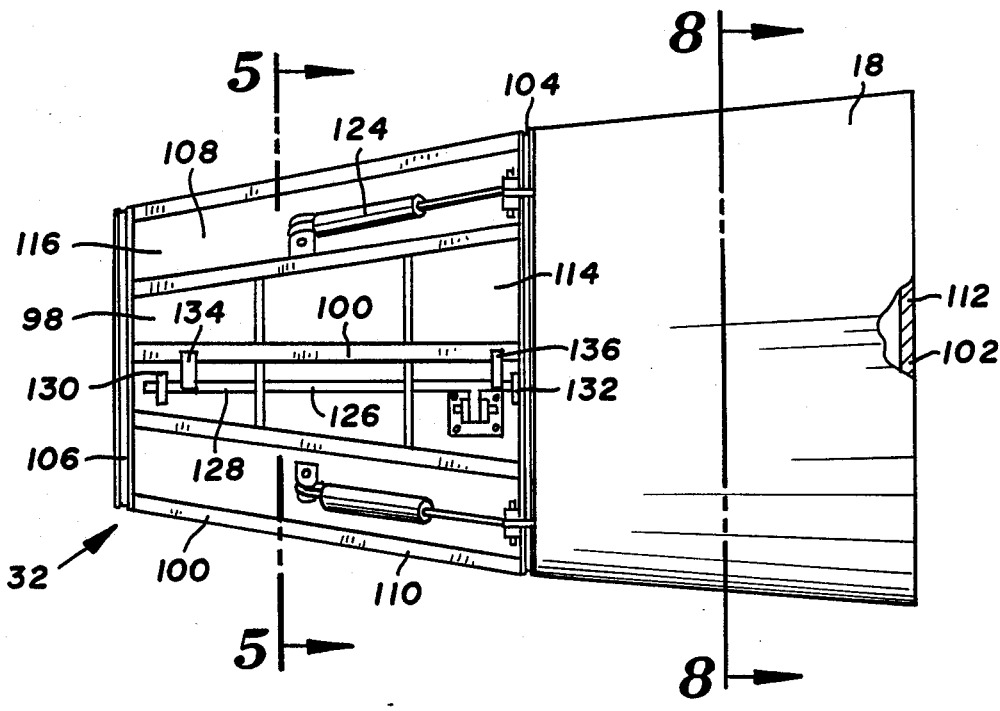
FIG. 4 is an enlarged side elevation of the fixture.
Figure 5:
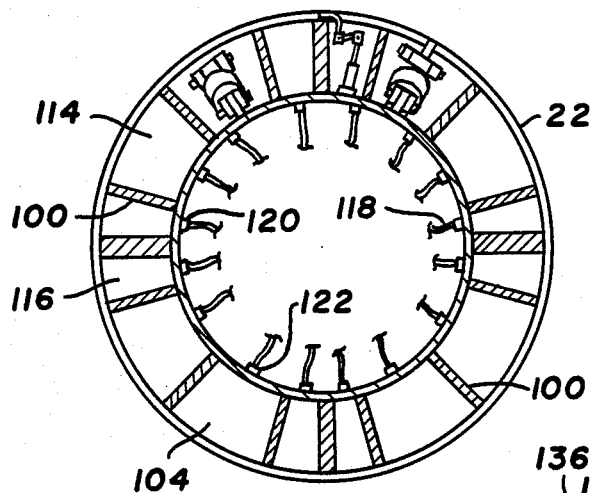
FIG. 5 is a sectional view taken along the line 5—5 in FIG. 4.

With reference to FIGS. 4 and 5, fixture 32 includes an annular, longitudinally directed central core or frame 98. Directed radially outward from the core are a plurality of ribs: sixteen linear ribs 100; and a plurality of transverse or circumferential ribs including a forward rib 102, a medial rib 194 and a rearward rib 106. Linear ribs 100 span the length of a rear segment 108 of the fixture corresponding to cone rearward section 20. Ribs 100 are designated generally longitudinal in a sense that they are contained within radial planes that also contain the longitudinal axis.

The linear add transverse ribs have radially outward facing surfaces: generally longitudinal surfaces 110 and transverse surfaces 112, respectively. Rib surfaces 110 and 112 directly support rear panels 24, and thus define the desired conical profile of rearward cone section 20.

The linear and circumferential ribs intersect one another and thus define a plurality of compartments, spanning the length of and distributed uniformly about rear fixture portion 108. The compartments include eight edge compartments 114 each spanning approximately 15° of arc, and eight intermediate compartments 116, each spanning an arc of about 30°. The compartments are arranged so that each 90° arc of fixture segment 108, corresponding to one of rear panels 24, includes two adjacent intermediate compartments between a pair of edge compartments. Consequently, each of linear ribs 100 supporting two of rear panels 24 along their interfacing edges, i.e., supporting one of seams 28, also is positioned between two of edge compartments 114.

When rear panels 24 are properly positioned on fixture 32, they overlie and enclose the compartments, so that each of compartments 114 and 116 can be partially evacuated. The resulting vacuum force or pressure differential tends to positively secure and maintain panels 24 against rear fixture segment 108. To draw the vacuum, a vacuum line 118 is provided between each chamber and a vacuum source, not illustrated.

A plurality of valves, one associated with each compartment, regulate the vacuum within the compartments. High vacuum valves 120 are associated with edge compartments 114, and low vacuum valves 122 associated with intermediate compartments 116. High vacuum valves 120 permit the drawing of a partial vacuum sufficient to create a relatively high pressure differential between each edge compartment and ambient pressure, for example seven or eight pounds per square inch. Low vacuum valves 122, on the other hand, allow a pressure differential of no more than about one pound per square inch. Hence, edge compartments 114 are high vacuum compartments which provide a maximum holding force where it is most needed, namely along and near the edges of each panel 24.

Eight circumferential edge stop assemblies 124 are mounted to core 98, one contained within each of intermediate compartments 116. Stop assemblies 124 align front panels 22 in a manner later explained in connection with FIG. 7. Also mounted to core 9B, within one of edge compartments 116, is a linear edge stop assembly 126 including an elongate bar 128 pivotally mounted with respect to core 98 through bar supports 130 and 132. A pair of linear edge stops 124 and 136 are fixed to bar 128 at its opposite ends. A pneumatic cylinder 138, mounted to core 98 through a base plate 140, is operable to pivot bar 98 to activate and retract stops 134 and 136.

Figure 6:
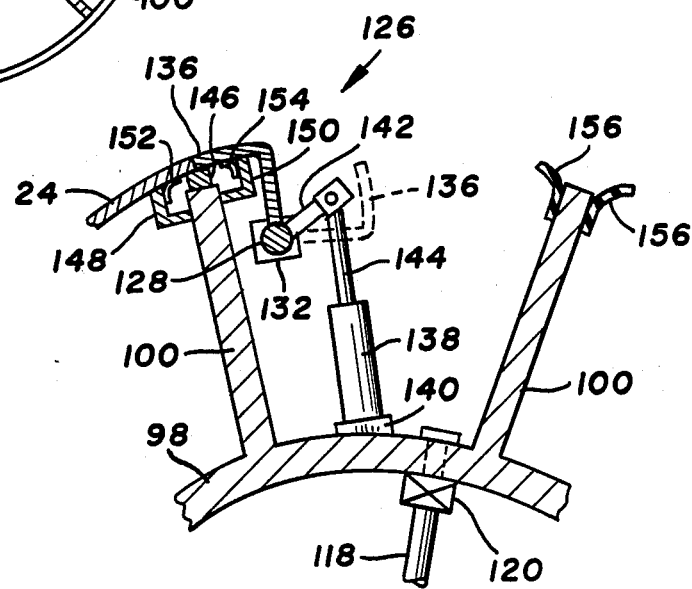
FIG. 6 is an enlarged sectional view showing part of FIG. 5.

FIG. 6 illustrates the edge compartment containing linear edge stop assembly 126. Stop 136 is L-shaped, with stop member 134 being substantially identical. A lever arm 142, integral with elongate bar 128, is pivotally attached to a rod 144 reciprocable within cylinder 138. With rod 144 extended, the stops are positioned as shown in solid lines, with their free edges centered over their associated linear rib 100. So positioned, stops 134 and 136 align the initial one of rear panels 24 placed onto rearward fixture segment 108. Alignment of the circumferential edge of the initial rear panel is provided by front panels 22, already in place against the fixture. Following positioning of the initial rear panel, rod 144 is retracted to pivot bar 128 clockwise, causing the stops to recede into their aassociated edge compartment and thus not interfere with the placement of successive rear panels.

A linear backing strip 146, preferably brass, is attached to each of linear ribs 100 that supports one of seams 28 to provide a backing along the associated seam which does not adhere to the weld material. Angle members 148 and 150, welded along opposite sides of each such linear rib 100, support gaskets 152 and 154 to sea the panel/rib junction. To isolate neighboring compartments, intermediate gaskets 156 are mounted along the remaining linear ribs.

Figure 7:
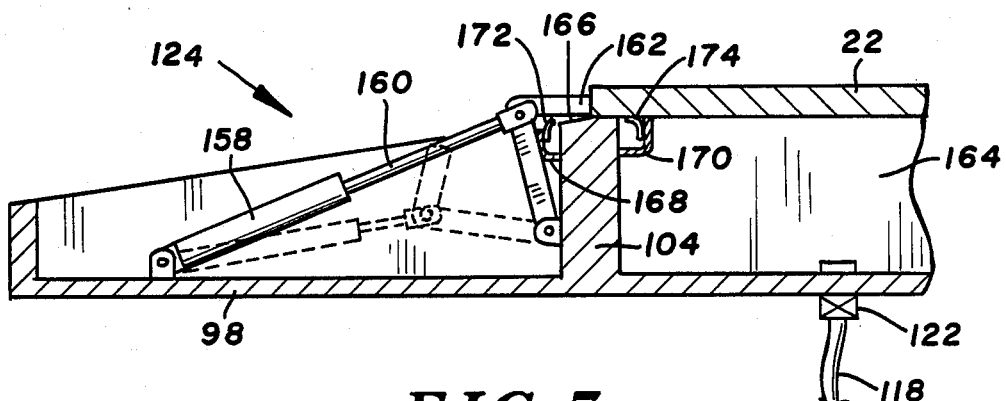
FIG. 7 is a side sectional view of a portion of the fixture.

As seen in FIG. 7, each circumferential edge stop assembly 124 includes a pneumatic cylinder 158 pivotally mounted with respect to core 98, and a rod 160 pivotally mounted to the corner portion of a generally L-shaped detent 162. One end of detent 162 is mounted pivotally With respect to medial rib 104. With rod 160 extended as shown in solid lines, detent 162 is aligned with its free edge centered over the medial rib. In this position, the eight detents 162 of edge stop assemblies 124 collectively ensure a proper alignment of front panels 22 as they are placed on a forward fixture segment 164 of the fixture. Following alignment of the front panels, the L-shaped detents are retracted as shown in broken lines so that they do not interfere with the subsequent positioning of rear panels 24.

Further in connection with FIG. 7, a backing ring or bar 166, preferably copper, is mounted to medial rib 104 along its entire circumference. The radially outward surface of backing bar 166 is selectively inclined to correspond to the incline of front and back panels 22 and 24, respectively. Angle members 168 and 170, welded to opposite sides of rib 104, support gaskets 172 and 174 which seal the panel/rib junctions to facilitate drawing a vacuum in their associated compartments. The preferred gasket materials include neoprene, Teflon and silicone rubber.

Figure 8:
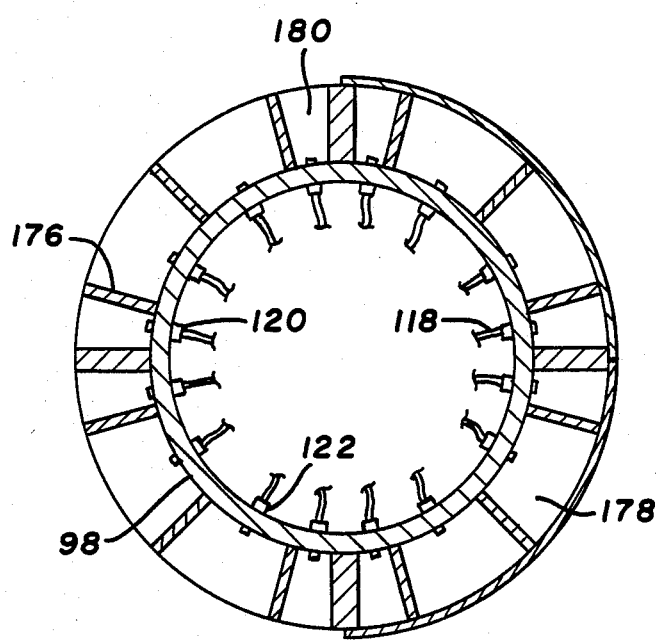
FIG. 8 is a sectional view taken along the line 8—8 in FIG. 4.

FIG. 8 shows forward fixture segment 164 to be substantially similar in construction to rear fixture segment 108, including core 98, sixteen linear ribs 176 extended radially outward of the core, positioned to define pair of intermediate compartments 178 bounded by edge compartments 180 in association with each of front panels 22. Low vacuum valves 122 and high vacuum valves 120 are associated with each of intermediate compartments 178 and edge compartments 180, respectively. As compared with the linear ribs 100 in rear segment 108, the linear ribs 176 are positioned to achieve the desired 45° offset between the front and rear panels.

A linear edge stop assembly 182, substantially identical to stop assembly 126, is mounted in one of edge compartments 180.

Figure 9:
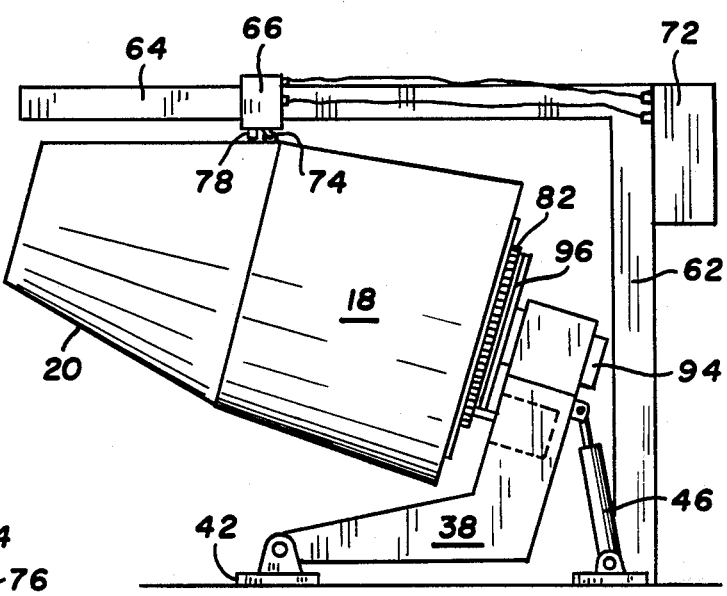
FIG. 9 is a side elevation of the fixture illustrating the linear weld.
Figure 10:
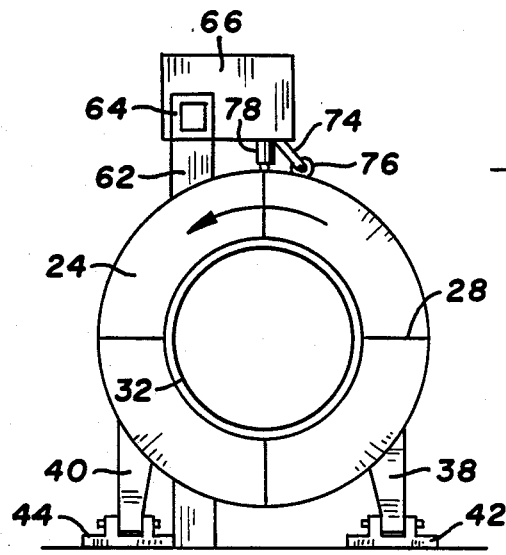
FIG. 10 is a rear elevation of the fixture illustrating a circumferential weld.

The assembly of cone 16 can be considered in connection with FIGS. 1, 9 and 10. Prior to any welding, all eight sheet metal panels are positioned against fixture 32 in their prescribed alignment. More particularly, with circumferential edge stop assemblies 124 and linear edge stop assembly 180 active, and with the vacuum source actuated to draw a low vacuum (e.g. The aforementioned pressure differential of about one psi), the initial one of front panels 22 is positioned, using the appropriate stops and detents as guides. Then, linear edge stop assembly 180 is retracted, and the remaining front panels are positioned on the fixture. Each subsequent front panel is aligned using the previously positioned front panel and the appropriate circumferential edge detents.

Once all front panels are in place, circumferential edge stop assemblies 124 are retracted, and the initial one of rear panels 24 is positioned against fixture 32, using activated linear edge stop assembly 126, and the already positioned front panels. Stop assembly 126 then is retracted, permitting placement of the remaining rear panels in the same manner as the front panels were positioned.

At this point, hydraulic cylinders 46 and 54 are actuated to align forward fixture section 164 with its top edge parallel to rail 64 as illustrated in FIG. 1. Carriage 66 is moved to the middle of the rail. If necessary, fixture 32 is rotated to position one of seams 26 directly beneath the carriage, to be encountered by probe 74 and welding tip 78.

Prior to welding, the vacuum drawn by the vacuum source is increased to a higher level in order to create the aforementioned seven to eight pound psi pressure differential in edge compartments 114 and 180. Meanwhile, the vacuum level in intermediate compartments 116 and 178 remains at the lower level, due to valves 122. The high pressure differential in the edge compartments, along and near all interfacing edges, ensures a positive holding of the panel.. This overcomes the tendency of the panels to return to their generally planar configuration by lifting away from fixture at their edges. Further, the panel edges are held firmly and control guide wheel 76 for a more accurate positioning of the welding tip.

To weld, carriage 66 is moved at a controlled velocity toward the right end of the rail, with guide wheel 76 traversing the seam and thereby setting the proper height and lateral position of welding tip 78, thus to weld the seam. The remaining seams 26 are welded in a substantially identical fashion, thus to complete forward section 18 of the cone.

Next, hydraulic cylinders 46 and 54 are actuated to tilt fixture 32 slightly clockwise as viewed in FIG. 1, thus to align rearward fixture section 20 with rail 64 as illustrated in FIG. 9. Fixture 32 then is rotated to properly align one of seams 28 for welding. Carriage 66 is moved from left to right to weld the seam, a difference being that the welding of seams 28 is initiated with the carriage near the left end of the rail, and completed when the carriage reaches the middle of the rail.

Following welding of seams 28 to complete rear cone section 20, the portion of welding carriage 66 supporting the probe and welding tip is rotated 90° (in a manner known in the art) to position the probe and tip as shown in FIG. 10. Carriage 66 is moved along rail 64 to position guide wheel 76 in girth seam 30, and then maintained stationary. To weld, fixture 32 is rotated counterclockwise as viewed in FIG. 10 and at a controlled speed, while the carriage remains stationary with respect to rail 64. Probe 74 and wheel 76 lead welding tip 78 as before, and fine adjust the tip as to height and lateral movement with respect to seam 30.

Thus, in accordance with the present invention, multiple sheet metal panels are first aligned, then maintained in the desired alignment for automatic welding to one another. In combination with the linearly movable welding carriage, the tiltable and rotatable fixture permits welding of differently inclined linear seams and enables welding of circumferential seams, all without direct operator intervention. The time required to form the panels into a unitary structure is substantially reduced. The need for direct operator handling of the panels during welding is eliminated, thus greatly enhancing operator convenience and safety.

What is claimed is:

1. A fixture for positioning a plurality of sheet members for joiner to one another in a predetermined configuration, including:

a substantially rigid frame means; a plurality of generally longitudinal ribs mounted to said frame means and extended away from a frame surface of said frame means substantially normal to said frame surface; and a plurality of generally transverse ribs mounted to said frame means and extended away from and substantially normal to said frame surface; said longitudinal and transverse ribs intersecting one another and having generally longitudinal and generally transverse outer rib surfaces, respectively, together forming a predetermined profile spaced apart form said frame surface, said frame means and said ribs cooperating to form a plurality of compartments;

said longitudinal and transverse ribs being adapted for supporting a plurality of sheet members in spaced apart relation to said frame surface and against said outer rib surfaces to substantially enclose said compartments, with at least selected ones of said longitudinal and transverse ribs supporting adjacent ones of said sheet members along interfacing edges of said sheet members, to facilitate a fastening of said sheet members to one another along said interfacing edges;

a suction means for drawing a vacuum in said compartments and thereby continually urging said sheet members against said outer rib surfaces whereby said sheet members conform to said predetermined profile, and are maintained against said outer rib surfaces during said fastening; and a sealing means along said outer rib surfaces for forming substantially fluid-tight seals between said sheet members and said compartments.

2. The fixture of claim 1 wherein:
said frame means comprises a generally cylindrical core, with said longitudinal and transverse ribs extended radially outward from said core.

3. The fixture of claim 1 wherein:
said sealing means along said outer rib surfaces forms a substantially fluid-tight seal between each of said sheet members and a plurality of said compartments associated with such sheet member.

4. The fixture of claim 3 wherein:
said sealing means comprises a plurality of elastically deformable gaskets running the length of at least selected ones of said longitudinal and transverse ribs and mounted with respect to said outer rib surfaces.

5. The fixture of claim 1 wherein:
said suction means includes a plurality of pressure regulating valve means, one of said valve means associated with each of said compartments.

6. The fixture of claim 5 wherein:
said plurality of valve means includes a plurality of first valve means associated with selected ones of said compartments, and a plurality of second valve means associated with the remaining ones of said compartments, said first valve means in cooperation with said suction means drawing a first level of vacuum in said ones of said compartments, and said second valve means and suction means drawing a second level of vacuum in said remaining compartments substantially lower than said first level of vacuum.

7. The fixture of claim 1 including:
a stop means for adjusting the position of said sheet members as said members are placed against said ribs.

8. The fixture of claim 7 wherein:
said stop means includes a plurality of detent members mounted pivotally with respect to said frame means, and means for selectively pivoting said detent members between a stop position adapted for abutment by said interfacing edges of said sheet members, and a retracted position.

9. The fixture of claim 2 wherein:
said predetermined profile is generally cylindrical and concentric about said core, said sheet members are constructed of metal, and wherein said fastening consists of welding said sheet metal members to one another to form a generally cylindrical drum; and wherein said fixture further includes a rotational drive means for rotating said fixture about a longitudinal axis of said core.

10. The fixture of claim 2 further including:
a pivotal moving means for rotating said fixture about an axis transverse to said longitudinal axis, for selectively angularly positioning said fixture.

* * * * *